April 18, 1950     L. B. LE VESCONTE     2,504,851
RECORDING TABLE FOR NETWORK CALCULATORS
Filed Dec. 7, 1946                                          2 Sheets-Sheet 1
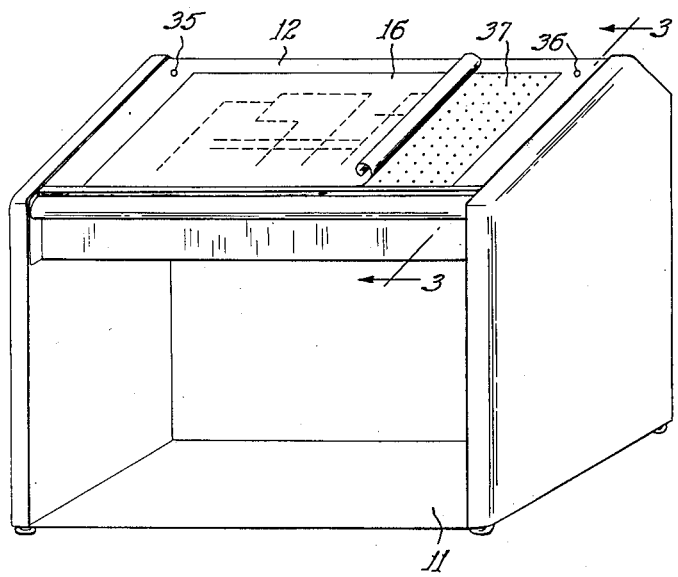
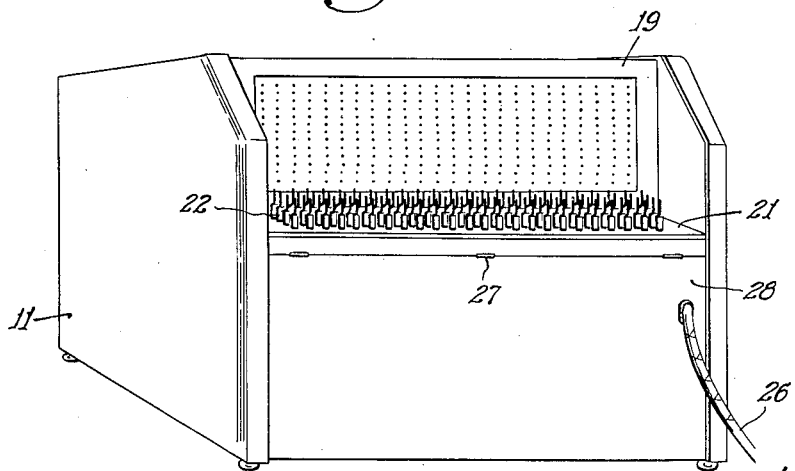
Inventor:
Lester B. LeVesconte
By: Alois W. Graf
Atty.

April 18, 1950     L. B. LE VESCONTE     2,504,851
RECORDING TABLE FOR NETWORK CALCULATORS
Filed Dec. 7, 1946                                           2 Sheets-Sheet 2
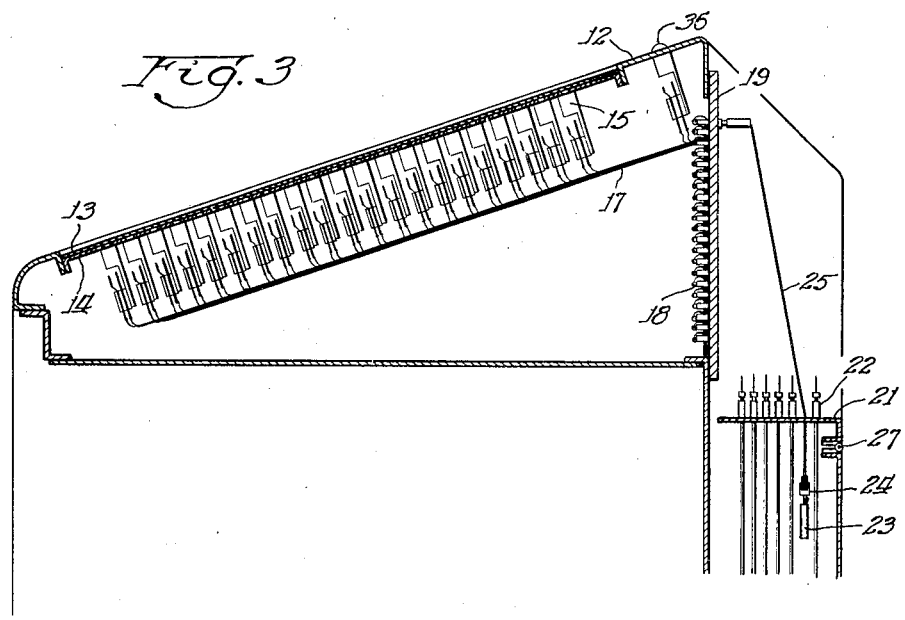
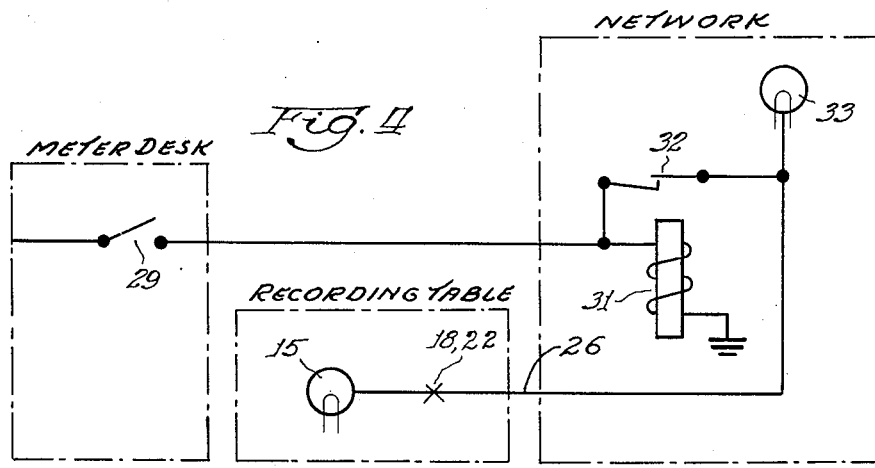
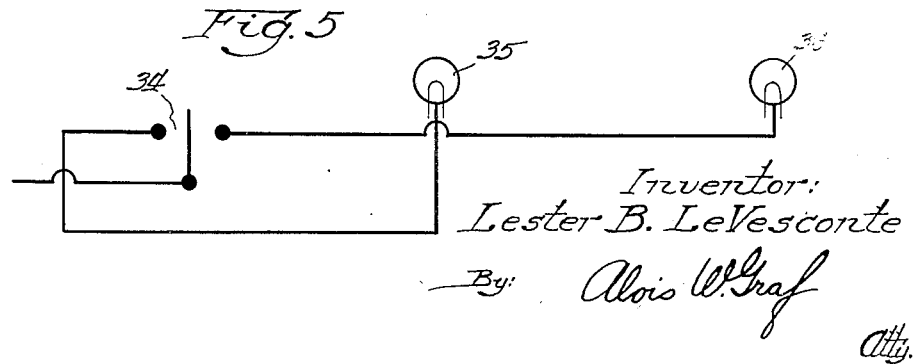
Inventor:
Lester B. LeVesconte
By: Alois W. Graf
Atty.

Patented Apr. 18, 1950

2,504,851

UNITED STATES PATENT OFFICE 2,504,851

RECORDING TABLE FOR NETWORK CALCULATORS

Lester B. Le Vesconte, Elmhurst, Ill.

Application December 7, 1946, Serial No. 714,852

7 Claims. (Cl. 177—311)

The present invention relates to a recording table for network calculators.

In order to solve power system problems network calculators or analyzers have been devised on which the system to be studied is duplicated in miniature. Adjustments are made on the network calculator until all of the setup readings match exactly the known quantities of the system to be studied. Thereafter certain changes may be made and new operating conditions are presented. As each new setup is completed or a new setup condition is presented, it is necessary to read and record the electrical quantities present in certain or all of the components of the circuit. In the past this reading and recording of the electrical quantities generally has involved four steps.

From the setup diagram of the system a table is prepared listing all of the circuits that should be measured or metered. Secondly, the readings are recorded in this tabulation as the circuits are metered. Third, a multiplier is employed to convert the calculator readings to system quantities. Fourth, the system quantities are then taken from the tabulation and plotted on a copy of the system diagram where they can be checked as to accuracy and interpreted as to their meaning in the study of the system. While a great volume of data can be obtained in a given time by this method, it is also recognized that the information in that form is not particularly useful until it has been plotted on the diagram.

On some network calculators the greater portion of the third step in the process mentioned above which converts the calculator readings to system quantities, has been eliminated by calibrating the watt-var meter to read directly in system quantities, provided certain preferred bases are used for the original setup. While the volt meter commonly employed reads directly in per cent voltage, direct readings of the system voltages in kilovolts can be obtained by utilizing voltage sliderules located near the volt meter.

In performing the operations of switching the meters to different points in the network system, the readings are taken and after a set of readings has been taken it is common to set up on the network calculator another set of conditions while meanwhile certain individuals are plotting the previous set of readings. If however the conclusions to be drawn from the results of a particular study of one operating condition of the network should show some questionable readings that preferably should be rechecked, such results are generally not known until the subsequent calculator operation has been advanced too far to repeat the previous study without considerable effort and modification of the network calculator. It therefore is apparent that a great saving of effort could be accomplished if the results from the fourth or last step previously mentioned were readily available as the different readings were taken and the testing of the network progressed.

In accordance with the present invention it is proposed to greatly simplify the procedure heretofore employed by recording the readings directly on the system diagram. By such system of direct recording there is eliminated the possibility of recording readings on the wrong circuit. A further safeguard is obtained against reading the wrong scale on the meter or using the wrong multiplier because the values around each junction point on the circuit may be checked readily. Such an arrangement furthermore makes practical the recording of only those values that are significant in cases where a minor change in the conditions simulated for the network affects only a limited area of the system, thereby eliminating a volume of unnecessary readings.

It therefore is an object of the present invention to provide a novel auxiliary equipment which facilitates network calculator operation.

A further object of the present invention is the provision of a device for facilitating the searching and finding of component parts of a circuit on a circuit diagram.

A still further object of the present invention is to provide an improved recording table for use with a network calculator.

Other and further objects of the present invention subsequently will become apparent by reference to the following description taken in conjunction with the accompanying drawing wherein:

Figure 1 is an isometric front view of the device constructed in accordance with the present invention;

Figure 2 is an isometric rear view of the device shown in Figure 1;

Figure 3 is a cross-sectional view as seen in the direction of the arrows along the line 3—3 of Figure 1;

Figure 4 is a line diagram illustrating the interconnection between the network calculator and certain signal lamps of the recording table; and Figure 5 is a line diagram illustrating the connections between the reversing switch of the watt-var meter and other signal lamps.

Referring to the drawing it will be seen that the recording table constructed in accordance with the present invention has a generally rectangular base 11 which supports an inclined top surface 12. The greater portion of the top surface 12 is constructed of a rectangular sheet of translucent material or glass 13. Immediately beneath the translucent glass 13 is provided a supporting structure 14 which carries a plurality of lamps 15. The lamps are spaced approximately one inch apart in each direction so that with most diagrams such as the circuit diagram 16, a light position can be associated with each circuit element. The various lamps 15 are connected through suitable conductors arranged in a cable 17 which is connected to a plurality of jacks 18. The jacks 18 are mounted on a rear panel 19.

To the rear of rear panel 19 and immediately beneath this panel there is located a plug panel 21 which carries a plurality of plugs 22 which are provided with counterbalance weights 23 and pulleys 24 for the plug cords. The cords 25 of the various plugs 22 are suitably separated so that the counterbalance weights and pulleys will not become entangled. The cords are electrically connected to suitable conductors formed into a cable 26 which is connected to appropriate components of the network calculator. In order to provide access to the cords of the plugs 22, the supporting board or table 21 for the plugs may be hinged by a plurality of hinges 27 to a rear panel 28.

The network calculator is a combination of generators and inductive and capacitive impedances. These impedances and generators may be combined so as to establish a plurality of circuits which reproduce in miniature an existing network. A typical network calculator is shown and described in U. S. Patent No. 2,315,649 granted April 6, 1943, for a Selective circuit metering device. The plugs are each numbered to correspond with a circuit element on the calculator. Since any plug, representing a circuit element on the calculator, can be inserted into any jack, it is possible to assign whatever circuit number is desired to each lamp position beneath the diagram 16. The control panel for the network calculator is provided with a plurality of circuit drawers each provided with a signal light controlled by a metering relay located adjacent the circuit element of the calculator. A typical arrangement is shown in Fig. 2 of Patent No. 2,315,649. The metering relays are operated by a circuit selector controlled by a set of push buttons on the meter desk. The circuit diagram for such a desk is shown in Fig. 1 of Patent No. 2,315,649. Only one such relay can be energized at a time. The circuit diagram in Figure 4 shows the metering switch 29 which is located on the meter desk. The meter desk is located adjacent the recording table as represented diagrammatically in Fig. 4 by the dotted rectangles. The closing of this switch completes a circuit to the metering relay 31 which closes its contact 32 to energize the signal lamp 33 on the circuit drawer of the panel of the calculator. Switch 29, relay 31, contact 32 and lamp 33 of the drawing correspond respectively to push button SK which controls switch contact C1, relay 230, contact 300 and lamp 302 of Patent No. 2,315,649. In accordance with the present invention the circuit from the lamp 33 is connected through the plug and jack arrangement 18, 22 to one of the signal lamps 15 of the recording table. The metering desk also carries a reversing switch which is provided with a single pole double throw set of contacts 34 shown in Figure 5 for controlling a pair of lamps 35 and 36 placed at opposite corners adjacent the top edge of the top panel 12 of the recording table. The reversing switch which carries the switch contacts 34 shown in Figure 5 reverses the connections to the watt-var meter. The light in the upper lefthand corner of the table is generally designated as the positive light, and the other light in the upper righthand corner is known as the negative light so that the person recording the data can readily see which light is illuminated. These lights therefore indicate the direction of the flow of power through the particular circuit component being metered. The lights reduce the strain on thte meter reader at the metering table since he can concentrate on selecting the correct meter scale and the multiplier without having to keep in mind the position of the direction indicating switch. The recorder therefore observes the direction and notes it with the magnitude of the meter value on the diagram.

As each circuit in turn is set up on the push buttons at the meter desk, the circuit selector energizes the proper relay to connect that circuit element to the meter bus, and the same relay energizes the proper light on the circuit drawer and on the recording table. Preferably the light from each lamp under the circuit diagram 16 is concentrated by providing a shielded construction which employs a plurality of .08" holes designated at 37 in Figure 1. Preferably in using the recording table it is desirable to lay the diagram out with lines on 1" centers as far as practicable to match the position of the lights. When numbers have been assigned to each circuit, a copy of the diagram is placed on the recording table, and as each circuit is metered the proper light is illuminated beneath the circuit diagram.

In a particular embodiment of the present invention a recording table of this type employed 693 jacks and plugs and a corresponding number of lights. In addition there were provided the positive and negative lights to indicate the direction of flow of power. In the particular embodiment referred to it was found convenient to arrange the jacks in groups so that certain groups of jacks would be connected to certain types of circuit elements such as the generators, the inductive reactances, the capacitive reactances, and the like. Such an arrangement facilitates the connection of the recording table to the circuits set up on the network calculator. In the use of a device of this kind it has been found that the rate at which studies could be made was greatly increased with a reduced effort in recording these studies in suitable use for final consideration. On many occasions operators experienced in making calculator studies have completed more work than they had thought would be possible in the allotted time.

While for the purpose of illustrating and describing the present invention, a preferred embodiment has been illustrated in the drawings, it is to be understood that the invention is not to be limited thereby since such modifications in the components employed and in their arrangement are contemplated as may be commensurate with the spirit and scope of the invention set forth in the following claims.

What I desire to protect by Letters Patent of the United States is claimed:

1. A recording table for facilitating network calculator operations comprising a circuit diagram supporting surface provided with a plurality of spaced light sources to illuminate successively selected portions of said diagram, a jack for each of said light sources, a plurality of plugs for cooperation with said jacks, a pair of signals for indicating the direction of flow of power through a circuit element of the calculator network, and connections from said plugs and said signals to said network calculator for controlling the illumination of said light sources in coordination with associated circuit elements of said network calculator.

2. A recording table for facilitating network calculator operations comprising a circuit diagram supporting surface provided on the underside thereof with a plurality of spaced light sources for successively illuminating selected portions of said diagram, a plurality of jacks each connected to an individual one of said light sources, a plurality of plugs for cooperation with said jacks, said plugs each being adapted to be associated with a selected circuit element of the network calculator, a pair of signal lamps for indicating the direction of flow of power through a circuit element of the calculator network and connections from said plugs and said signal lamps to said network calculator for controlling the illumination of said light sources and said signal lamps in coordination with associated circuit elements of said network calculator.

3. The combination of a network calculator having a plurality of circuit elements each controlled by a relay, each relay controlling a signal circuit, a meter desk having a plurality of switches for controlling said relays and a reversing switch for reversing the connections of a meter connected to a selected circuit element with a recording table comprising a base structure having a translucent top, a plurality of lamps mounted beneath said top in regular spaced intervals and substantially covering the entire undersurface of said top, a jack for each of said lamps, a plurality of plugs for cooperation with said jacks, said plugs each being adapted to be associated with a selected one of said circuit element relays of said network calculator, and a pair of signal lamps for indicating the direction of operation of the reversing switch of said meter desk.

4. The combination with a network calculator having a plurality of circuit elements each controlled by a relay, each relay controlling a signal circuit, a meter connected to said relays, a plurality of switches for controlling said relays and a reversing switch for reversing the connections between said meter and said relays, comprising a recording table for facilitating network calculator operations comprising a base having an inclined top surface, said top surface being formed of a translucent sheet of material, a plurality of lamps mounted beneath said top surface in regular spaced intervals so as to cover substantially the entire undersurface of said top, a jack panel mounted at the rear of said top surface, said jack panel having a jack for each of said lamps, a plurality of plugs located adjacent said jack panel for cooperation with said jacks, said plugs each being connected to a relay associated with a selected circuit element of the network calculator, and a pair of signal lamps located at opposite upper corners of said top for indicating the direction of flow of power through a selected circuit element corresponding to an illuminated one of said lamps.

5. A recording table for a network calculator having a meter table provided with switches for controlling a relay for connecting certain circuit elements to a meter, said relay also controlling a signal circuit, comprising a table having a surface for supporting a translucent circuit diagram, said surface being divided into spaced intervals, means for illuminating selected intervals of said surface including a lamp for each selected interval, a plug and jack for each lamp and connections therefrom to a selected signal circuit whereby the illumination of the selected interval of said surface is controlled to correspond to the circuit element connected to said meter.

6. An accessory for a network calculator having a watt meter provided with a reversing switch and a plurality of circuit elements each controlled by a relay comprising a table having an inclined top for supporting a translucent circuit diagram, said top including a shield provided with relatively small regularly spaced apertures to cover substantially equal intervals in rectangular configuration under the entire surface of a translucent circuit diagram, a plurality of lamps for the apertures in said shield, a jack for each of said lamps, a pair of signal indicators for indicating the direction of flow of power to the circuit element of the calculator network being metered, a plurality of plugs for cooperation with said jacks, and electrical conductors for interconnecting each of said plugs with a selected circuit element relay of the network calculator and for connecting said pair of signal indicators to said reversing switch associated with said watt meter.

7. An accessory for a network calculator or analyzer having a plurality of circuit elements each controlled by a relay, each relay controlling a signal circuit, a meter connected to said relays, a plurality of switches for controlling said relays and a reversing switch for reversing the connection between said meter and said relays, comprising a device having a translucent-circuit-diagram supporting surface, a plurality of lights arranged beneath said surface so that a light can be associated with substantially each circuit element of said diagram, a plurality of plugs and jacks for interconnecting each light with the corresponding circuit element of said network calculator or analyzer, means for controlling the illumination of said light in conjunction with said meter to indicate on said diagram the circuit element being metered, and a signal for indicating the direction of flow of power through the circuit element being metered.

LESTER B. LE VESCONTE.

REFERENCES CITED

The following references are of record in the file of this patent:

UNITED STATES PATENTS

| Number | Name | Date |
| --- | --- | --- |
| 1,879,887 | Schleicher | Sept. 27, 1932 |
| 1,963,722 | Smith | June 19, 1934 |
| 1,983,311 | Schleicher | Dec. 4, 1934 |
| 2,084,169 | Venzke | June 15, 1937 |
| 2,204,315 | Levin | June 11, 1940 |
| 2,301,470 | Starr | Nov. 10, 1942 |
| 2,315,649 | Parker et al. | Apr. 6, 1943 |
| 2,417,043 | Blewett | Mar. 11, 1947 |